US009806380B2

(12) United States Patent
Kumar et al.

(10) Patent No.: US 9,806,380 B2
(45) Date of Patent: Oct. 31, 2017

(54) HIGH TEMPERATURE ELECTROCHEMICAL CELL STRUCTURES, AND METHODS FOR MAKING

(71) Applicant: GENERAL ELECTRIC COMPANY, Schenectady, NY (US)

(72) Inventors: Sundeep Kumar, Bangalore (IN); Thomas Martin Angeliu, Clifton Park, NY (US); Mohamed Rahmane, Ballston Lake, NY (US); Arunabh Basak, Bangalore (IN); Raghavendra Rao Adharapurapu, Bangalore (IN); Tobias Eicke Juetting, Birmingham (GB)

(73) Assignee: General Electric Company, Niskayuna, NY (US)

( * ) Notice: Subject to any disclaimer, the term of this patent is extended or adjusted under 35 U.S.C. 154(b) by 496 days.

(21) Appl. No.: 14/321,072

(22) Filed: Jul. 1, 2014

(65) Prior Publication Data

US 2014/0356682 A1    Dec. 4, 2014

Related U.S. Application Data

(63) Continuation-in-part of application No. 13/907,017, filed on May 31, 2013.

(51) Int. Cl.
*H01M 4/36*    (2006.01)
*H01M 10/39*   (2006.01)
(Continued)

(52) U.S. Cl.
CPC ......... *H01M 10/399* (2013.01); *B23K 35/001* (2013.01); *B23K 35/004* (2013.01);
(Continued)

(58) Field of Classification Search
CPC ...... H01M 10/399; H01M 2/08; H01M 10/38; B23K 35/3033; B23K 35/304;
(Continued)

(56) References Cited

U.S. PATENT DOCUMENTS 4,105,834 A    8/1978  Baker
4,112,204 A    9/1978  McRae
(Continued)

FOREIGN PATENT DOCUMENTS

CN    101733497 A    6/2010
EP    0233824 A2     8/1987
(Continued)

OTHER PUBLICATIONS

Nascimento et al., "Brazing Al2O3 to sintered Fe—Ni—Co alloys", Springer Link, Dec. 1, 1999, pp. 5839-5845, vol. 34, Issue 23.
(Continued)

*Primary Examiner* — Gary Harris
(74) *Attorney, Agent, or Firm* — John P. Darling (57) ABSTRACT

An electrochemical cell is described, including an anodic chamber and a cathodic chamber separated by an electrolyte separator tube, all contained within a cell case. The cell also includes an electrically insulating ceramic collar positioned at an opening of the cathodic chamber, and defining an aperture in communication with the opening; along with a cathode current collector assembly; and at least one metallic ring that has a coefficient of thermal expansion (CTE) in the range of about 3 to about 7.5 ppm/° C., contacting at least a portion of a metallic component within the cell, and an adjacent ceramic component. An active braze alloy composition attaches and hermetically seals the ring to the metallic component and the collar. Sodium metal halide batteries that contain this type of cell are also described, along with methods for sealing structures within the cell.

15 Claims, 4 Drawing Sheets

(51) Int. Cl.
| | |
|---|---|
| *H01M 10/38* | (2006.01) |
| *B23K 35/30* | (2006.01) |
| *B23K 35/00* | (2006.01) |
| *B23K 35/02* | (2006.01) |
| *C04B 37/00* | (2006.01) |
| *C04B 37/02* | (2006.01) |
| *H01M 2/08* | (2006.01) |
| *C22C 19/05* | (2006.01) |

(52) U.S. Cl.
CPC ...... *B23K 35/0233* (2013.01); *B23K 35/0238* (2013.01); *B23K 35/304* (2013.01); *B23K 35/3033* (2013.01); *C04B 37/006* (2013.01); *C04B 37/026* (2013.01); *C22C 19/05* (2013.01); *C22C 19/058* (2013.01); *H01M 2/08* (2013.01); *H01M 10/38* (2013.01); *C04B 2237/12* (2013.01); *C04B 2237/122* (2013.01); *C04B 2237/123* (2013.01); *C04B 2237/343* (2013.01); *C04B 2237/40* (2013.01); *C04B 2237/405* (2013.01); *Y10T 29/4911* (2015.01)

(58) Field of Classification Search
CPC ............... B23K 35/001; B23K 35/004; B23K 35/0233; B23K 35/0238; C04B 37/006; C04B 37/026; C04B 2237/12; C04B 2237/122; C22C 19/05; C22C 19/058; Y10T 29/4911
USPC ........................................................ 429/104
See application file for complete search history.

(56) References Cited

U.S. PATENT DOCUMENTS

| | | | |
|---|---|---|---|
| 4,749,118 | A | 6/1988 | Yokoi et al. |
| 5,009,357 | A | 4/1991 | Baker |
| 5,043,229 | A | 8/1991 | Mizuhara |
| 5,161,908 | A | 11/1992 | Yoshida |
| 5,163,770 | A | 11/1992 | Soma |
| 5,183,636 | A | 2/1993 | DuBois |
| 5,334,344 | A | 8/1994 | Hegner |
| 5,351,874 | A | 10/1994 | Rajner |
| 6,315,188 | B1 | 11/2001 | Cadden |
| 7,544,275 | B2 | 6/2009 | Lamaze |
| 7,758,970 | B2 | 7/2010 | Shinkai |
| 8,757,471 | B2 | 6/2014 | Kumar |
| 2009/0041611 | A1 | 2/2009 | Saithian |
| 2010/0218875 | A1 | 9/2010 | Weil |
| 2010/0327537 | A1 | 12/2010 | Johnson |
| 2013/0224561 | A1 | 8/2013 | Adharapurapu |
| 2013/0315659 | A1 | 11/2013 | Kumar |
| 2013/0316222 | A1 | 11/2013 | Adharapurapu |
| 2013/0316226 | A1 | 11/2013 | Adharapurapu |
| 2014/0049878 | A1* | 2/2014 | Tamachi ............. H01M 2/0277 361/502 |
| 2014/0110460 | A1 | 4/2014 | Kumar |
| 2014/0186690 | A1* | 7/2014 | Moscinski ............ H01M 10/39 429/185 |
| 2016/0354869 | A1 | 12/2016 | Kumar |

FOREIGN PATENT DOCUMENTS

| | | |
|---|---|---|
| EP | 0333149 A2 | 9/1989 |
| JP | 5780657 A | 5/1982 |
| JP | 5780658 A | 5/1982 |
| JP | 3126681 A | 5/1991 |
| JP | 3295871 A | 12/1991 |
| JP | 06243890 A | 9/1994 |
| JP | 7300376 A | 11/1995 |
| JP | 2003288867 A | 10/2003 |
| JP | 2009039784 | 2/2009 |
| KR | 20080055741 A | 6/2008 |
| WO | 9965642 A1 | 12/1999 |
| WO | 9966569 A1 | 12/1999 |

OTHER PUBLICATIONS

Nascimento et al., "Interface microstructure of alumina mechanically metallized with Ti brazed to Fe—Ni—Co using different fillers", ScienceDirect, Sep. 25, 2007, pp. 195-200, vol. 466, Issues 1-2.

Yang et al., "Mechanisms of Cracks Forming in Al_2O_3/Kovar Brazing Joint", Journal of Jiangsu University of Science and Technology(Natural Science Edition), Jan. 2005.

Qiao et al., "Brazing Al2O3 to Kovar Alloy with Ni/Ti/Ni Interlayer and Dramatic Increasing of Joint Strength after Thermal Cycles", Scientific.Net, Jun. 2005, pp. 481-484, vols. 486-487.

Kumar, Sundeep et al. "Electrochemical Cells Useful for Energy Storage Devices", U.S. Appl. No. 14/210,675, filed Mar. 14, 2014, pp. 1-20.

Kumar, Sundeep et al. "Methods of Using Active Braze Techniques for Making High Temperature Rechargeable Batteries", U.S. Appl. No. 13/610,941, filed Sep. 12, 2012, pp. 1-24.

Kumar, Sundeep et al., "A Brazing Structure, and Related Processes and Devices", U.S. Appl. No. 13/907,017, filed May 31, 2013, pp. 1-20.

Tinsley et al., "The Reduction of Residual Stress Generated inMetal-Ceramic Joining", Materials and Manufacturing Processes,vol. 13, Issue 4, pp. 491-504, 1998.

Zhang et al., "Effedct of Residual Stress on the Strength of an Alumina-Steel Joint by Partial Transient Liquid Phase (PTLP) Brazing", vol. 122, Issue 2-3, pp. 220-225, Mar. 28, 2002.

Galli,et al., "Relief of the Residual Stresses in Ceramic-Metal Joints by a Layered Braze Structure", Advanced Engineering Materials, vol. 8, Issue 3, pp. 197-201, Mar. 2006.

Crispin et al., "The Wetting and Bonding Behaviour of Some Nickel Alloy-Alumina Systems", Journal of Materials Science, vol. 11, Issue 1, pp. 17-21, Jan. 1976.

Sugama et al., "Effect of Interlayers in Ceramic-Metal Joints with Thermal Expansion Mismatches", Journal of the American Ceramic Society, vol. 67, Issue 12, pp. C-256-C-257, Dec. 1984.

Dingyi et al., "The Effect of Molybdenum Net Interlayer on Thermal Shock Resistance of Al2O2/Nb Brazed Joint", Journal of Materials Processing Technology, vol. 96, Issues 1-3, pp. 19-21, Nov. 1, 1999.

Vianco et al., "A Barrier Layer Approach to Limit Ti Scavenging in FeNiCo/Ag—Cu—Ti/Al2O3 Active Braze Joints", Welding Research, vol. 82, Issue 9, pp. 252s-262S, Sep. 2003.

Yang et al., "Fracture behavior and reliability of brazed alumina joints via Mo—Mn process and active metal brazing", J. Mater. Res., vol. 15, No. 10, 2238-2243, Oct. 2000.

Machine translation of JP 2009039784 Sathian (Feb. 29, 2009).

* cited by examiner

HIGH TEMPERATURE ELECTROCHEMICAL CELL STRUCTURES, AND METHODS FOR MAKING

This patent application is a Continuation-in-Part of application Ser. No. 13/907,017, filed on May 31, 2013, for S. Kumar et al, the contents of which are incorporated herein by reference.

TECHNICAL FIELD

Electrochemical devices are the subject of this disclosure, e.g., batteries. In some particular embodiments, the invention relates to sealing systems for cells on which the devices are based.

BACKGROUND OF THE INVENTION

Metal chloride batteries, especially sodium-metal chloride batteries with a molten sodium negative electrode (usually referred to as the anode) and a beta-alumina solid electrolyte, are of considerable interest for energy storage applications. In addition to the anode, each cell of the battery includes a positive electrode (usually referred to as the cathode) that supplies/receives electrons during the charge/discharge of the battery. The solid electrolyte—often in the form of a tube—functions as the membrane or "separator" between the anode and the cathode. The cathode composition is typically contained inside the electrolyte tube, which is usually open on one end, and closed on the other end.

Figure 1:
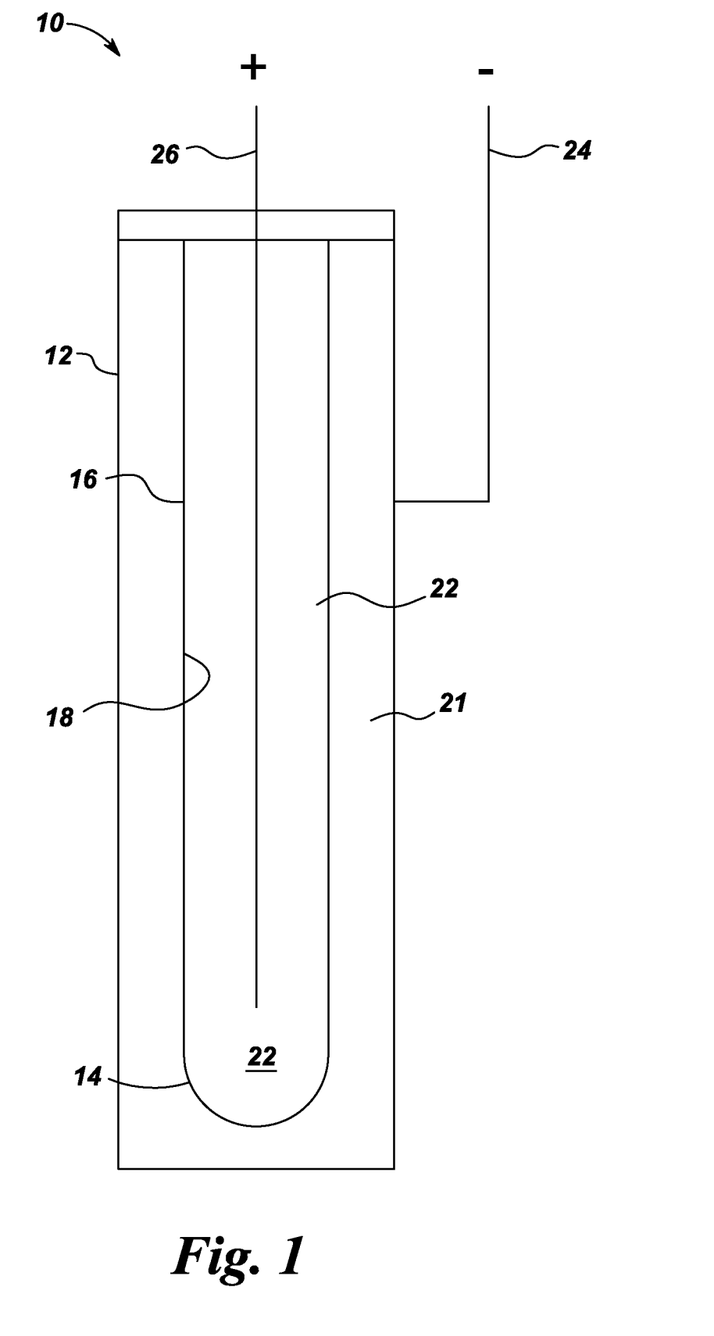
FIG. 1 is a schematic of an energy storage cell.

FIG. 1 is a simple illustration of an energy storage cell 10 (i.e., an electrochemical cell), e.g., one of a group of cells that collectively would form a metal chloride battery. The cell includes a housing 12. The housing includes a separator 14, having an outer surface 16, and an inner surface 18. The outer surface defines a first chamber 21 and the inner surface defines a second chamber 22 The first chamber is usually an anode including sodium, and the second chamber is a usually a cathode that can include a number of salts. The first chamber is in ionic communication with the second chamber through the separator. The first chamber and the second chamber further include an anode current collector 24 and a cathode current collector 26 to collect the current produced by the electrochemical cell. (The particular location and form of the current collectors can vary considerably). Other details regarding such a cell are provided, for example, in U.S. Pat. No. 7,632,604 (Iacovangelo et al), incorporated herein by reference.

The metal chloride batteries and other types of sodium-based thermal batteries can be employed in a number of applications, e.g., as part of the public utility-energy infrastructure. Several specific examples for the batteries include uninterruptable power supply (UPS) devices; and components for a battery backup system for a telecommunications ("telecom") device, sometimes referred to as a telecommunication battery backup system (TBS). The batteries are often capable of providing power surges (high currents) during the discharge cycle. In an ideal situation, the battery power can be achieved without a significant loss in the working capacity and the cycle life of the battery. The advantageous features of these types of batteries provide opportunities for applications in a number of other end use areas as well.

As alluded to above, the present design of a battery cell like those based on Na—NiCl$_2$ entails having the open end of a beta-alumina solid electrolyte tube joined to an alpha-alumina collar using a glass seal. The collar is in turn joined to nickel rings, with the help of thermal compression bonding (TCB). TCB is achieved through metallizing the alpha-alumina collar. The design of the present cell requires the seal to be resistant towards molten sodium and molten halide. (Sodium melts at 98° C., and NaAlCl$_4$ melts at 157° C.). The glass seal and TCB are two of the weak links in the present design for a path to long life. The glass seal and TCB encounter corrosion from sodium and halide and, because of this, are found to degrade over time.

Different paths have been taken to address the problem of corrosion. One involved trying to improve the quality of the glass seal and TCB. Another was to eliminate the glass seal and the TCB in the design of the cell. As an example, the seal can be eliminated by using a graded ceramic (beta-alumina tube with alpha-alumina header) tube. However, in the design where this graded tube is used, the nickel ring cannot be joined with the alpha-alumina collar using a TCB-like process. Therefore, alternate joining technologies are necessary.

Active brazing is a procedure in which one of the components in a braze alloy composition reacts with a ceramic material and forms an interfacial bond. With the concerns noted above, the braze alloy must be suitable for use in high temperature rechargeable batteries, and be very resistant to corrosion from sodium and halide materials. Very few commercially-available braze alloys possess the high-temperature capabilities required for manufacturing sodium metal halide cells, while also possessing the required corrosion resistance.

Conventionally, brazing is done through metallization, in combination with a braze alloy. The metallization (for example with Mo) is typically carried out at a temperature of about 1550° C. Metallization is a very sensitive process, and depends on a number of variables which need to be carefully controlled to obtain a robust metallization layer. Moreover, a metallization/TCB process can be complicated and expensive. Therefore, it is important to develop new techniques that can replace conventional metallization processes.

Active brazing has been known in the literature to join ceramic to metal, but there are not many commercially-available active braze alloys (ABAs), particularly high temperature (900-1250° C.) ABAs, which are resistant to corrosion from sodium and halide. Recently, certain active braze compositions have been successfully used for the sealing structures in metal halide cells (e.g., for the sodium-based types of batteries). Some of those compositions are described below. However, while their use can often satisfy the rigorous hermeticity requirements for the storage cells, there may still be some deficiencies when the cells are intended for certain applications (though not others). For example, the strength of the joint formed with the active braze composition may not always meet end use requirements.

It is thought that a key factor in diminished strength relates to the thermal expansion mismatch between the parts being brazed, e.g., a ceramic collar and a nickel ring. The relatively large difference in the coefficient of thermal expansion (CTE) can lead to large residual tensile stress in the ceramic component, e.g., an alumina component. The tensile stress can lead to micro-cracking or cracking in the joint, which can in turn lead to leakage and cell failure. This problem is exacerbated by the high temperatures required for some of the brazing compositions, as compared to the temperatures for TCB techniques which have been used for a similar purpose.

With the considerations noted above, new types of sealing structures and compositions for energy storage devices and other types of electrochemical cells would be welcome in the art. The new technology should provide hermetic sealing with a joint strength sufficient to meet rigorous end use requirements for the cell. Moreover, the overall sealing structure should be compatible with electrochemical cell contents that might come into contact with the seals. It would also be desirable if the sealing structures can be obtained with lower fabrication costs, e.g., as compared to some of the metallization/TCB processes used in conventional situations.

BRIEF DESCRIPTION

In one embodiment, an electrochemical cell for a sodium metal halide-based battery is described, comprising
(a) an anodic chamber for containing an anodic material; and a cathodic chamber for containing a cathodic material, separated from each other by an electrolyte separator tube, all contained within a case for the cell;
(b) an electrically insulating ceramic collar positioned at an opening of the cathodic chamber, and defining an aperture in communication with the opening;
(c) a cathode current collector assembly disposed within the cathode chamber;
(d) at least one ring comprising a metal or metal alloy that has a coefficient of thermal expansion (CTE) in the range of about 3 to about 7.5 ppm/° C. over a temperature range of about 30° C. to about 450° C., contacting at least a portion of a metallic component within the cell, and an adjacent portion of the ceramic collar; and
(e) a braze alloy composition attaching and hermetically sealing the ring to the metallic component and the collar, wherein the braze alloy composition comprises
(I) nickel; an active metal element; and at least one of (i) germanium; (ii) niobium and chromium; and (iii) silicon and boron; or
(II) copper, nickel, and an active metal element.

Another embodiment is directed to a sodium metal halide thermal battery, comprising a plurality of electrochemical cells that are in electrical communication with each other. Each cell comprises:
(a) an anodic chamber for containing an anodic material; and a cathodic chamber for containing a cathodic material, separated from each other by an electrolyte separator tube, all contained within a case for the cell;
(b) an electrically insulating ceramic collar positioned at an opening of the cathodic chamber, and defining an aperture in communication with the opening;
(c) a cathode current collector assembly disposed within the cathode chamber;
(d) at least one ring comprising a metal or metal alloy that has a coefficient of thermal expansion (CTE) in the range of about 3 to about 7.5 ppm/° C. over a temperature range of about 30° C. to about 450° C., contacting at least a portion of a metallic component within the cell, and an adjacent portion of the ceramic collar; and
(e) a braze alloy composition attaching and hermetically sealing the ring to the metallic component and the collar, wherein the braze alloy composition comprises one of the compositions mentioned above, and further described in the remainder of the specification.

An additional embodiment relates to an electrochemical cell for a sodium-based thermal battery that comprises an anodic chamber for containing an anodic material; a cathodic chamber for containing a cathodic material, and an intervening electrolyte separator tube, all contained within a case for the cell; wherein the electrochemical cell further includes at least one sealing ring formed of a metal or metal alloy that has a CTE in the range of about 3 to about 7.5 ppm/° C. over a temperature range of about 30° C. to about 450° C., contacting at least one ceramic structure within the cell.

A method of sealing an open region of a sodium metal halide-based battery, as described herein, constitutes another embodiment of the invention. The method comprises the steps of
(i) inserting a ring comprising a metallic alloy that has a coefficient of thermal expansion (CTE) in the range of about 3 to about 7.5 ppm/° C., between at least a portion of the cathode current collector assembly and an adjacent portion of the ceramic collar; and
(ii) brazing the ring to the current collector assembly and the ceramic collar with one of the braze alloy compositions described herein, so as to hermetically seal the ring to the current collector assembly.

The method can be used to seal alternative (or additional) structures within the battery, as also described below. For example, a ring can be inserted between at least a portion of an upper region of the ceramic collar, and an adjacent portion of the cell case. Brazing is then used to hermetically seal the ring to the collar and the cell case.

DETAILED DESCRIPTION OF THE INVENTION

In regard to this disclosure, any ranges disclosed herein are inclusive and combinable (e.g., compositional ranges of "up to about 25 wt %", or more specifically, "about 5 wt % to about 20 wt %", are inclusive of the endpoints and all intermediate values of the ranges). Moreover, the terms "first," "second," and the like, herein do not denote any order, quantity, or importance, but rather are used to distinguish one element from another. Each embodiment presented below facilitates the explanation of certain aspects of the invention, and should not be interpreted as limiting the scope of the invention. Moreover, approximating language, as used herein throughout the specification and claims, may be applied to modify any quantitative representation that could permissibly vary, without resulting in a change in the basic function to which it is related. Accordingly, a value modified by a term or terms, such as "about," is not limited to the precise value specified. In some instances, the approximating language may correspond to the precision of an instrument for measuring the value.

In the following specification and claims, the singular forms "a", "an" and "the" include plural referents unless the context clearly dictates otherwise. As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances, the modified term may sometimes not be appropriate, capable, or suitable.

As mentioned above, one aspect of the present invention relates to energy storage devices that include sealing systems in which device components can be hermetically sealed to each other. The sodium-based battery cells that benefit greatly from these inventive concepts are known in the art, and are usually of the sodium metal halide- or sodium-sulfur type. Many details regarding some of these types of devices are provided, for example, in U.S. patent application Ser. No. 13/407,870, filed Feb. 29, 2012; Ser. No. 13/538,203, filed Jun. 29, 2012; Ser. No. 13/600,333, filed Aug. 31, 2012; Ser. No. 13/628,548, filed Sep. 27, 2012; Ser. No. 13/483,841, filed May 30, 2012; and Ser. No. 13/595,541 filed Aug. 27, 2012, all of which are expressly incorporated herein by reference, in their entirety.

Figure 2:
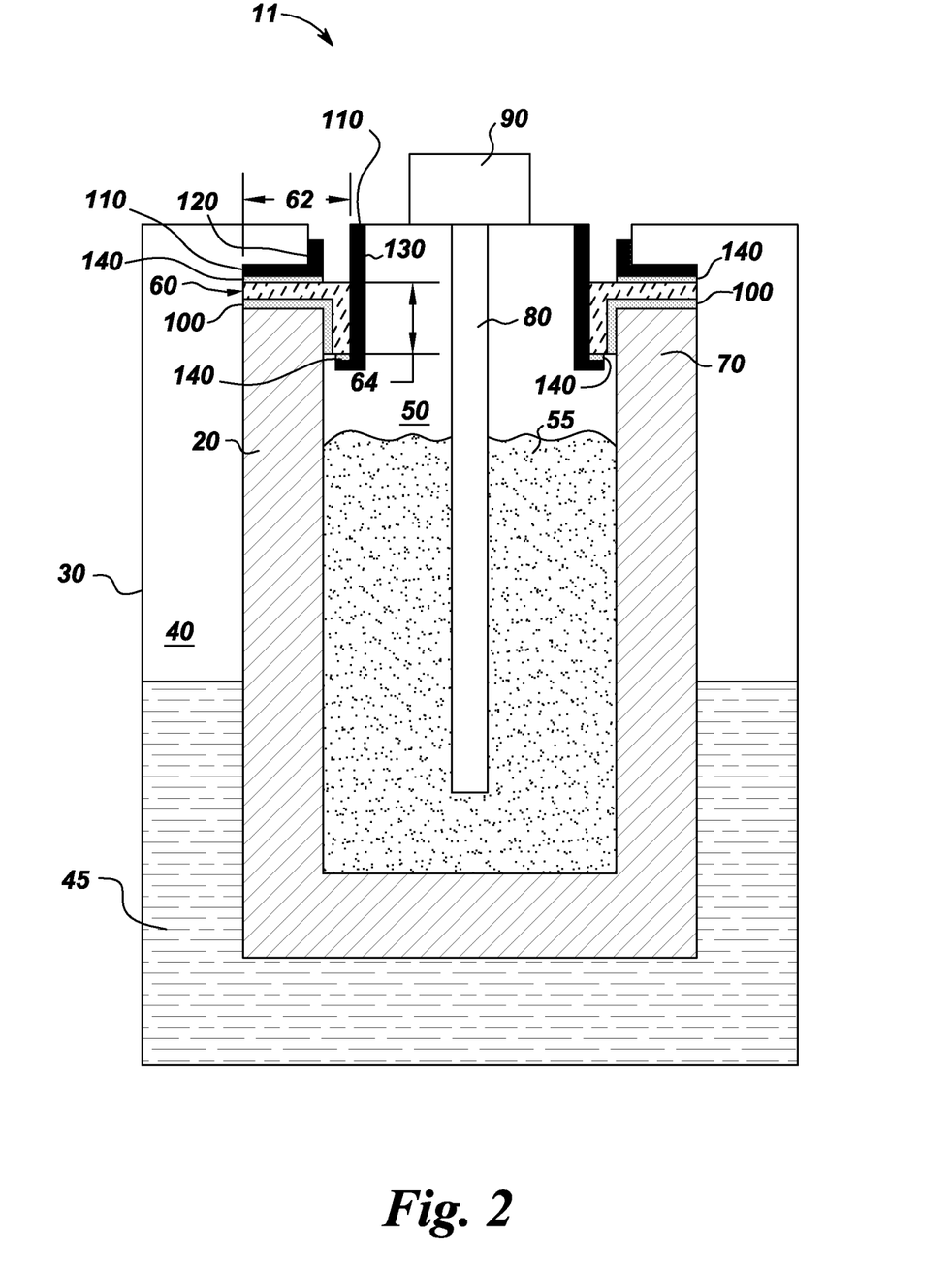
FIG. 2 is a cross-sectional view of an energy storage cell according to embodiments of the present invention.

FIG. 2 is a schematic diagram depicting an exemplary embodiment of a sodium-metal halide battery cell 11. The cell 11 has an ion-conductive separator tube 20 disposed in a cell case 30 (usually the outer structure of the cell). The separator tube 20 is usually made of β"-alumina, and preferably, beta"-alumina (beta double prime alumina). The tube 20 defines an anodic chamber 40 between the cell case 30 and the tube 20, and a cathodic chamber 50, inside the tube 20. The anodic chamber 40 is usually filled with an anodic material 45, e.g. sodium. The cathodic chamber 50 contains a cathode material 55 (e.g. nickel and sodium chloride), and a molten electrolyte, usually sodium chloroaluminate ($NaAlCl_4$), along with some other additives.

An electrically insulating collar 60, which may be made of alpha-alumina or spinel, is situated at a top end 70 of the tube 20. A cathode current collector assembly 80 is often disposed in the cathode chamber 50, with a cap structure 90, in the top region of the cell. In this exemplary embodiment, the collar 60 is fitted onto the top end 70 of the separator tube 20, and is sealed by a glass seal 100 in an existing battery design. In one embodiment, the collar 60 includes an upper portion 62, and a lower inner portion 64 that abuts against an inner wall of the tube 20 through glass seal 100, as illustrated in FIG. 2.

In order to seal the cell 11 at the top end (i.e., its upper region), and to ensure that the anode and cathode are chemically and physically separate from each other, and from the collar 60 in the corrosive environment, at least one ring is employed. Thus, ring 110, made of metal or a metal alloy, is disposed, covering the collar 60, and joining the collar with the current collector assembly 80 (extending upwardly and outwardly), at the cap structure 90. The ring 110 often has two portions; an outer ring 120 and an inner ring 130, which are joined, respectively, with the upper portion 62 and the lower portion 64 of the collar 60, by means of the active braze seal 140. (The outer ring contacts at least a portion of the ceramic collar and an adjacent portion of the cell case, through the braze material described herein. The inner ring contacts at least a portion of the cathode current collector assembly and an adjacent portion of the collar. While the term "portions" is used above, in most embodiments, these are two separate rings which are not in contact with each other). The active braze seal 140 is provided by the braze alloy composition described below. The collar 60 and the ring 110 may be temporarily held together with an assembly (e.g., a clamp), or by other techniques, if necessary, until sealing is complete.

The outer ring 120 and the inner ring 130 are usually welded shut to seal the cell, after joining with the collar 60 is completed. The outer ring 120 can be welded to the cell case 30; and the inner ring 130 can be welded to the current collector assembly 80.

The shapes and size of the several components discussed above with reference to FIG. 2 are only illustrative for the understanding of the cell structure; and are not meant to limit the scope of the invention. The exact position of the seals and the joined components can vary to some degree. Moreover, each of the terms "collar" and "ring" is meant to comprise metal or ceramic parts of circular or polygonal shape, and in general, all shapes that are compatible with a particular cell design.

At least one of the rings described above is formed from a metallic alloy that has a coefficient of thermal expansion (CTE) in the range of about 3 to about 7.5 ppm/° C., over a temperature range of about 30° C. to about 450° C. As described below, the present inventors discovered that the use of such an alloy provided critical joints with a combination of good strength and hermeticity. These enhanced sealing sites can ensure required levels of integrity for sodium nickel battery cells and other types of electrochemical devices.

In some embodiments, the metallic alloy forming the ring is selected from the group consisting of molybdenum, tungsten, and niobium. Alloys of one of more of these metals may also be used. In some instances, molybdenum is particularly preferred, because of its superior chemical compatibility and relative ease of use in manufacturing.

In other preferred embodiments, the metallic alloy forming the ring is either an iron-nickel alloy, or a nickel-cobalt ferrous alloy (i.e., also containing iron). Some of these alloys contain at least about 25% (by weight) nickel, and at least about 15% cobalt, along with iron. They often contain other elements as well, such as one or more of carbon, silicon, and manganese—each at a level that is usually less than about 1% by weight, with the balance being iron. Additional elements that are sometimes incorporated—also usually at less than 1% each—are at least one of aluminum, chromium, magnesium, zirconium, titanium, copper, and molybdenum. In some specific embodiments, the metallic alloy will have a CTE in the range of about 5.1 to about 5.5 ppm/° C.

Some of the representative commercial alloys suitable for inventive embodiments are Kovar®-type materials; NILO™ Alloy K, Pernifer™ alloys (e.g., Pernifer 2918), Rodar™ alloys, Invar® alloys (e.g., Invar 36); and Dilvar™ alloys, e.g., Dilvar P1. One illustrative alloy useful for the present invention includes about 29% (by weight) nickel, about 17% cobalt, and less than about 1% (each) of carbon, silicon, and manganese, with the balance being iron. In general, these alloys can readily be formed into a variety of shapes and sizes that would be appropriate for the metallic rings used in this invention. (For simplicity, the iron-nickel and nickel-cobalt ferrous alloys are sometimes collectively referred to here as "Kovar®" alloys.)

As briefly described previously, the metallic rings formed from the specialized alloys are often located near the opening of a sodium metal halide battery, i.e., in the section which will eventually be sealed before the battery becomes operational. Thus, with reference to FIG. 2, ring 110 has two portions: an outer ring 120 and an inner ring 130, joined, respectively, with the upper portion 62 and lower portion 64 of collar 60. Those skilled in the art will be able to select the most appropriate size and shape of a particular ring section, based on various considerations set forth herein. (It should be emphasized that, just as the shape, size, and architecture of the battery may vary, so can the location and the particular design of the opening region. The inventive embodiments covered in this disclosure apply to any area in which ceramic structures require connection and sealing to metallic structures).

The sealing mechanism for attaching the metal rings to the ceramic sections of the electrochemical cell preferably rely on at least one active braze composition. Typically, "brazing" uses a braze material (usually an alloy) having a lower liquidus temperature than the melting points of the components (i.e. their materials) to be joined, e.g., metal components and an alpha-alumina collar. The braze material is brought to or slightly above its melting (or liquidus) temperature, while protected by a suitable atmosphere. The braze material then flows over the components (known as wetting), and is then cooled to join the components together.

As used herein, "braze alloy composition" or "brazing alloy", or "braze material", refers to a composition that has the ability to wet the components to be joined, and to seal them. A braze alloy for a particular application should withstand the service conditions required, and melt at a lower temperature than the base materials, or melt at a very specific temperature. Conventional braze alloys usually do not wet ceramic surfaces sufficiently to form a strong bond at the interface of a joint. In addition, the alloys may be prone to sodium and halide corrosion.

The term "brazing temperature" refers to a temperature to which a brazing structure is heated to enable a braze alloy to wet the components to be joined, and to form a brazed joint or seal. The brazing temperature is often higher than or equal to the liquidus temperature of the braze alloy. In addition, the brazing temperature should be lower than the temperature at which the components to be joined may not remain chemically, compositionally, and mechanically stable. There may be several other factors that influence the brazing temperature selection, as those skilled in the art understand.

As mentioned previously, the braze alloy composition used herein is one capable of forming a joint by active brazing with one or more active braze materials. In some specific embodiments, e.g., in the case of sodium-based thermal batteries, the braze composition also has a relatively high resistance to sodium and halide corrosion. Moreover, brazing techniques used in this type of electrochemical cell application can often result in lower-cost, higher capacity manufacturing, as compared to similar TCB applications. The present inventors have also come to understand that the brazing process can be more flexible than TCB techniques, since the latter require significant loads to promote diffusion bonding in a sealing process. The added flexibility can more readily accommodate changes in the collar-ring/bridge piece design for the sealing structure of a cell.

In some embodiments, the braze alloy composition includes nickel and an active metal element; and further comprises a) germanium, b) niobium and chromium, or c) silicon and boron. Alternatively, the braze alloy composition may comprise copper, nickel, and an active metal element. Each of the elements of the alloy contributes to at least one property of the overall braze composition, such as liquidus temperature, coefficient of thermal expansion, flowability or wettability of the braze alloy with a ceramic, and corrosion resistance.

As alluded to previously, active brazing uses an active metal element that promotes wetting of a ceramic surface, enhancing the capability of providing a seal (e.g., a hermetic seal). "Sealing", as used herein, is a function performed by a structure that joins other structures together, to reduce or prevent leakage through the joint between the other structures. The seal structure may also be referred to as a "seal." An "active metal element", as used herein, refers to a reactive metal that has a higher affinity to the oxygen than to the metallic element, and thereby reacts with the ceramic. (A braze alloy composition containing an active metal element can also be referred to as an "active braze alloy").

The active metal element is thought to undergo a decomposition reaction with the ceramic, when the braze alloy is in a molten state, and leads to the formation of a thin reaction layer on the interface of the ceramic and the braze alloy. The thin reaction layer allows the braze alloy to wet the ceramic surface, resulting in the formation of a ceramic-metal joint/bond, which may also be referred to as an "active braze seal."

Thus, an active metal element is an essential constituent of a braze alloy for employing active brazing. A variety of suitable active metal elements may be used to form the active braze alloy. The selection of a suitable active metal element mainly depends on the chemical reaction with the ceramic (e.g., alpha-alumina of the collar) to form a uniform and continuous reaction layer, and the capability of the active metal element of forming an alloy with a base alloy (e.g. Ni—Ge alloy).

An "active" element will react with the ceramic, forming a reaction layer between the ceramic and the molten braze that will reduce the interfacial energy to such a level that wetting of the ceramic takes place. In some preferred embodiments, the active metal element is titanium. Other suitable examples of the active metal element include, but are not limited to, zirconium, hafnium, and vanadium. A combination of two or more active metal elements may also be used.

The presence and the amount of the active metal may influence the thickness and the quality of the thin reactive layer, which contributes to the wettability or flowability of the braze alloy, and therefore, the bond strength of the resulting joint. The active metal element is generally present in small amounts suitable for improving the wetting of the ceramic surface, and forming the thin reaction layer, for example, a layer of less than about 10 microns. A high amount of the active metal layer may cause or accelerate halide corrosion.

The braze alloy composition may further include at least one alloying element. The alloying element may provide further adjustments in several required properties of the braze alloy, such as the coefficient of thermal expansion, liquidus temperature, and brazing temperature. In one embodiment, the alloying element can include, but is not limited to, cobalt, iron, chromium, niobium, or a combination thereof.

Several of the exemplary locations for the active braze are shown in FIG. 2, involving the collar 60 and the ring structure 110. (As mentioned above, the latter often has two sections: an outer ring 120 and an inner ring 110). Thus, an active braze layer 140 (or braze deposit in some other shape) can be formed between an upper surface of collar 60 and outer ring 120. The active braze can also be situated between inner ring 130 and a lower or bottom portion of the collar. In some embodiments, the braze alloy composition further comprises at least one of silicon and boron, often used to suppress the melting temperature or liquidus temperature of the alloy.

Those skilled in the art understand that commercial energy storage devices most often include a plurality of the electrochemical cells described herein. The cells are, directly or indirectly, in thermal and/or electrical communication with each other. The general principles of such devices are known in the art.

Another embodiment of the invention is directed to a method of sealing an open region of an electrochemical cell, such as a cell (or multiple cells) of a sodium metal halide-based battery. The open region is usually the top portion of the cell, or some other entry point for various internal components, electrode and electrolyte compositions, and the like. Final assembly of the cell usually requires the sealing structure described above. As also described above, the internal structure of each cell usually includes the anodic chamber, the cathodic chamber, and an electrolyte separator tube. A ceramic collar is also positioned at an opening of the cathodic chamber, defining at least a portion of the open region. As also described above, a cathode current collector assembly is disposed within the cathode chamber.

The method includes the step of inserting a ring between the ceramic collar and at least one adjacent portion of the cell structure, e.g., the cathode current collector assembly, or the outer case of the battery, which sometimes functions as the anode current collector. Each ring that is used can be formed of a metallic alloy that has a coefficient of thermal expansion (CTE) in the range of about 3 to about 7.5 ppm/° C.

Each ring is then brazed to both the ceramic collar and the adjacent structure, as generally depicted in FIG. 2, and described above. An active braze alloy composition is used, as also described above, to seal the structures. The use of the particular braze alloy composition, in conjunction with the specialized ring alloy, results in a seal for the cell that satisfies a set of diverse manufacturing and performance requirements.

EXAMPLES

The following examples are directed to some general concepts and embodiments of the invention. They are not intended to limit the scope of the invention.

Computer modelling, based on finite element analysis, was used to examine certain properties in metal-alumina brazed components. The braze material was an active braze alloy of Ni-7Cr-4.5Fe-4.5Si-3.2B-2Ti (NSB-2Ti) (by weight). In addition to evaluating metal components formed from nickel, molybdenum, or niobium, a Kovar® alloy was evaluated also, having the following composition: Fe-29Ni-17Co.

Figure 3:
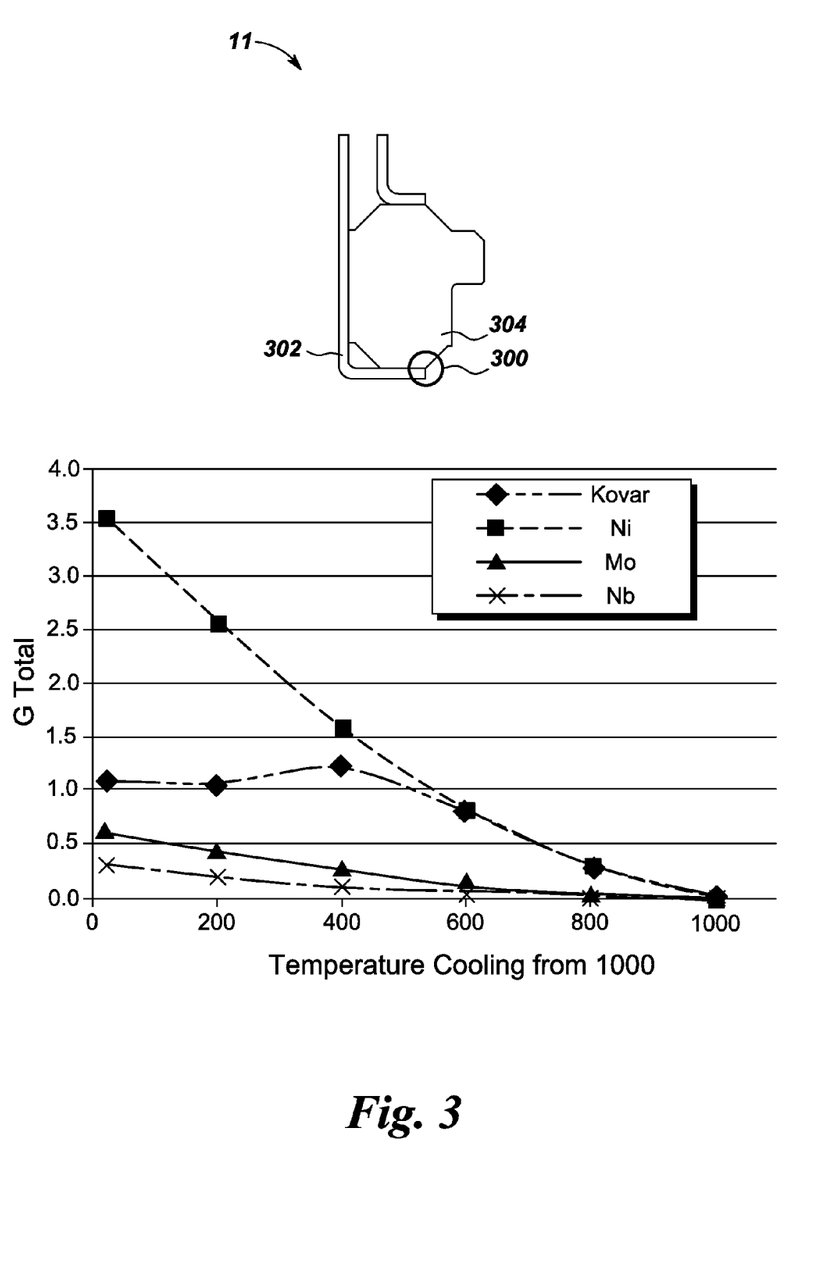
FIG. 3 is a graph of calculated mechanical stress values as a function of temperature, for a set of ceramic-metal joint structures.

The results are set forth in FIG. 3. The figure is a graph of mechanical stress values (G total, on the Y-axis), as a function of temperature. The modelling is based on an exemplary joint, depicted in the inset above the graph. The circled region 300 is an exemplary section in which metal ring 302 is joined to alumina collar 304, and the residual tensile stress can be predicted at that region.

A large positive value for "G" in that region represents relatively high stress, which is thought to promote the propagation of cracks, thereby lowering the joint strength. Thus, G can illustrate the effect of the CTE mismatch in the joint region. The graph in FIG. 3 indicates that when nickel is used as the material for the metal ring, the mechanical stress component G is highest. The G value is much lower in the case of the Kovar® alloy, molybdenum, and niobium, indicating that the residual stresses in the joints using these materials would also be greatly reduced.

Figure 4:
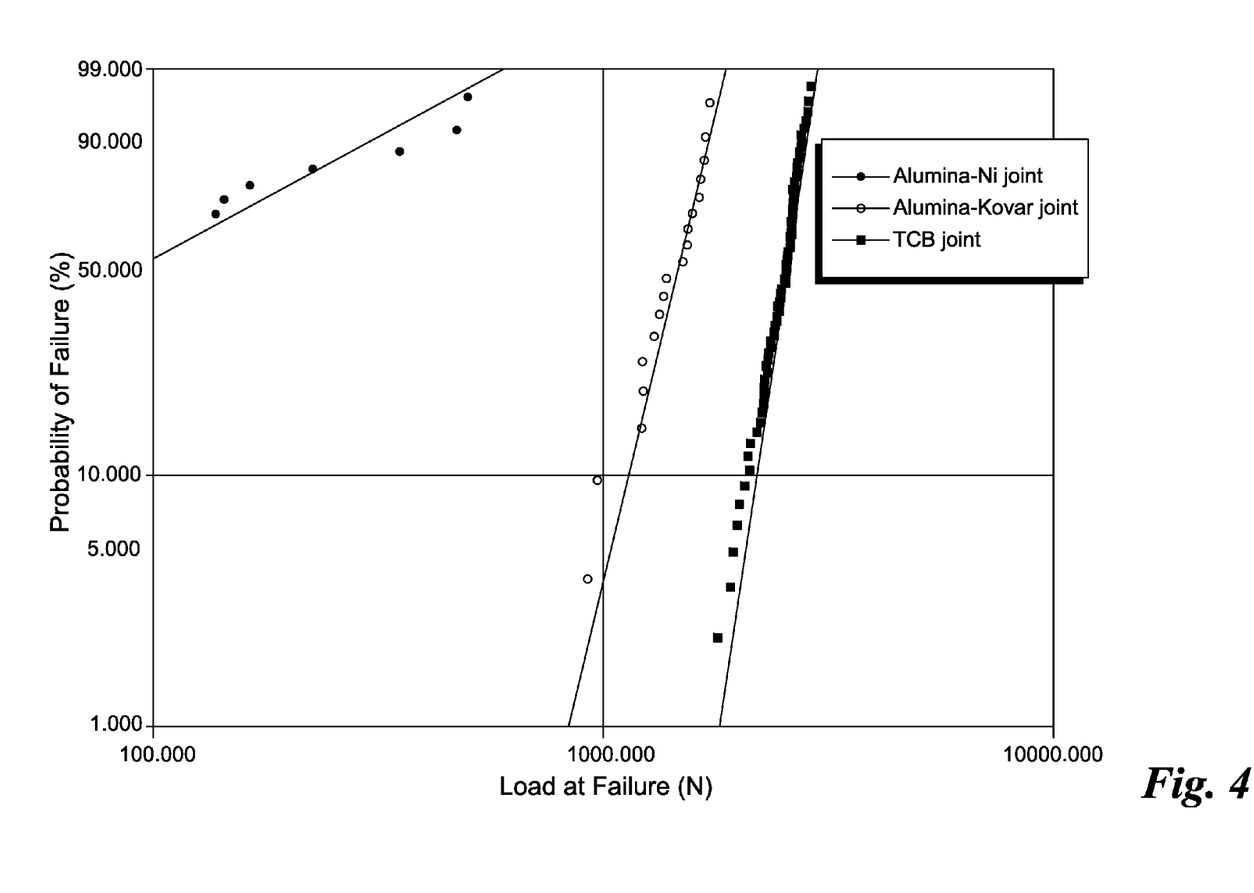
FIG. 4 is a graph of failure probability as a function of load-at-failure, for various types of alumina-metal joint structures.

FIG. 4 is directed to characteristics for an alumina-Kovar® joint formed with an active braze material, having the following composition: Ni-7Cr-4.5Fe-4.5Si-3.2B-2Ti (NSB-2Ti). The figure is a series of Weibull plots (2-parameter Weibull). The X-axis on the graph represents load-at-failure, in Newtons; while the Y-axis represents the probability of failure in percent (%), sometimes referred to as "Unreliability", F(t). The joint of the present invention is compared with a base-line type of joint structure, in which alumina is bonded to a nickel ring by a thermo-compression bond (TCB). The desired "target" for joint performance is a lower-specification limit of 1100N (as load-to-failure on the X-axis), with a z-score of 3. Bond strength is based on a peel test that measures the load-at-failure, in Newtons. In this test, a peeling force is applied to the metal component (e.g., nickel or a Kovar alloy), and the peeling force necessary to separate the component from the alumina component is measured.

The data of the graph of FIG. 4 show greater bond strength with the Kovar-alumina joint active braze joint, as compared to the nickel-alumina active braze joint. The Kovar-alumina joint met the requirements of a lower spec limit of 1100N, with the z-score of 3. In contrast, the strength of the nickel-alumina active braze joint was well-below requirements for sealing an electrochemical cell.

Hermeticity tests were also undertaken, in which the helium leak rate is measured through the joint-region of the components. The helium leak rate should be less than 4E-9 mbar-1/sec, in order to meet the specifications for a hermetic joint. The alumina-Kovar joint satisfied the hermetic specifications. In contrast, an alumina-nickel active braze joint did not meet the 100% hermeticity requirement, although a TCB joint did meet the 100% requirement. It is therefore apparent that the types of joints for embodiments of the present invention exhibit a combination of strength, hermeticity, and corrosion to sodium-halide battery contents, making them ideal for seal structures for the electrochemical cells described in this specification. Moreover, the alumina-Kovar joints can also be more readily formed than structures like the TCB joints, and this is an additional advantage in a manufacturing setting.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed:

1. An electrochemical cell for a sodium metal halide-based battery, comprising:
    (a) an anodic chamber for containing an anodic material; and a cathodic chamber for containing a cathodic material, separated from each other by an electrolyte separator tube, all contained within a case for the cell;
    (b) an electrically insulating ceramic collar positioned at an opening of the cathodic chamber, and defining an aperture in communication with the opening;
    (c) a cathode current collector assembly disposed within the cathode chamber;
    (d) at least one ring comprising a metal or metal alloy that has a coefficient of thermal expansion (CTE) in the range of about 3 to about 7.5 ppm/° C. over a temperature range of about 30° C. to about 450° C., contacting at least a portion of a metallic component within the cell, and an adjacent portion of the ceramic collar; and
    (e) a braze alloy composition attaching and hermetically sealing the ring to the metallic component and the collar, wherein the braze alloy composition comprises (I) nickel; an active metal element; and at least one of
(i) germanium; (ii) niobium and chromium; and (iii) silicon and boron; or (II) copper, nickel, and an active metal element.

2. The electrochemical cell of claim 1, wherein the metallic alloy forming the ring is selected from the group consisting of
(A) molybdenum, tungsten, niobium; and alloys thereof; and
(B) iron-nickel alloys or nickel-cobalt ferrous alloys.

3. The electrochemical cell of claim 2, wherein the metallic alloy forming the ring has a CTE in the range of about 5.1 to about 5.5 ppm/° C. over a temperature range of about 30° C. to about 450° C.

4. The electrochemical cell of claim 2, wherein the metallic alloy forming the ring comprises iron, at least about 25% by weight nickel; and at least about 15% cobalt.

5. The electrochemical cell of claim 4, wherein the metallic alloy forming the ring further comprises less than about 3% by weight (each) of at least one of carbon, silicon, and manganese.

6. The electrochemical cell of claim 1, wherein the ring contacts at least a portion of the cathode current collector assembly and an adjacent portion of the ceramic collar.

7. The electrochemical cell of claim 1, wherein the ring contacts at least a portion of the ceramic collar and an adjacent portion of the cell case.

8. The electrochemical cell of claim 7, wherein the ring attaches and hermetically seals the cell case to the ceramic collar, by way of another portion of the braze alloy composition.

9. The electrochemical cell of claim 1, wherein the separator tube is formed of a beta"-alumina (beta double prime alumina) material; and the ceramic collar comprises alpha-alumina.

10. The electrochemical cell of claim 1, wherein the braze alloy composition further comprises at least one alloying element selected from cobalt, iron, chromium, or niobium.

11. The electrochemical cell of claim 1, wherein the active braze further comprises at least one of silicon or boron.

12. The electrochemical cell of claim 1, wherein the active metal of the braze alloy composition comprises titanium, zirconium, hafnium, vanadium, or a combination thereof.

13. A sodium metal halide thermal battery, comprising a plurality of electrochemical cells that are in electrical communication with each other, wherein each electrochemical cell comprises:
(a) an anodic chamber for containing an anodic material; and a cathodic chamber for containing a cathodic material, separated from each other by an electrolyte separator tube, all contained within a case for the cell;
(b) an electrically insulating ceramic collar positioned at an opening of the cathodic chamber, and defining an aperture in communication with the opening;
(c) a cathode current collector assembly disposed within the cathode chamber;
(d) at least one ring comprising a metal or metal alloy that has a coefficient of thermal expansion (CTE) in the range of about 3 to about 7.5 ppm/° C. over a temperature range of about 30° C. to about 450° C., contacting at least a portion of a metallic component within the cell, and an adjacent portion of the ceramic collar; and
(e) a braze alloy composition attaching and hermetically sealing the ring to the metallic component and the collar, wherein the braze alloy composition comprises
(I) nickel; an active metal element; and at least one of (i) germanium; (ii) niobium and chromium; and (iii) silicon and boron; or
(II) copper, nickel, and an active metal element.

14. The sodium metal halide thermal battery of claim 13, comprising at least two of the rings.

15. An electrochemical cell for a sodium-based thermal battery that comprises an anodic chamber for containing an anodic material; a cathodic chamber for containing a cathodic material, and an intervening electrolyte separator tube, all contained within a case for the cell; wherein the electrochemical cell further includes at least one sealing ring formed of a metal or metal alloy that has a CTE in the range of about 3 to about 7.5 ppm/° C. over a temperature range of about 30° C. to about 450° C., contacting at least one ceramic structure within the cell.

* * * * *